US012692100B2

(12) United States Patent
Vaserman

(10) Patent No.: US 12,692,100 B2
(45) Date of Patent: Jul. 28, 2026

(54) CONVEYOR SYSTEM INCLUDING CONVEYOR PICKER

(71) Applicant: PACKLINE USA, LLC, Rancho Cucamonga, CA (US)

(72) Inventor: Gil Vaserman, Ramat Gan (IL)

(73) Assignee: PACKLINE USA, LLC, Rancho Cucamonga, CA (US)

( * ) Notice: Subject to any disclaimer, the term of this patent is extended or adjusted under 35 U.S.C. 154(b) by 179 days.

(21) Appl. No.: 18/493,264

(22) Filed: Oct. 24, 2023

(65) Prior Publication Data

US 2025/0128893 A1 Apr. 24, 2025

(51) Int. Cl.
*B65G 47/91* (2006.01)

(52) U.S. Cl.
CPC .................................... *B65G 47/91* (2013.01)

(58) Field of Classification Search
CPC ........ B65G 47/91; B25J 9/0093; B25J 9/1697
USPC ......................................... 198/377.08; 901/7
See application file for complete search history.

(56) References Cited

U.S. PATENT DOCUMENTS

| | | | | |
|---|---|---|---|---|
| 7,313,464 B1 * | 12/2007 | Perreault | ................ | B25J 9/1666 |
| | | | | 700/262 |
| 10,369,701 B1 * | 8/2019 | Diankov | ................ | B25J 9/0093 |
| 10,906,188 B1 * | 2/2021 | Sun | ........................... | B07C 5/36 |
| 11,511,417 B1 * | 11/2022 | Meiswinkel | ........... | B25J 13/088 |
| 11,780,096 B2 * | 10/2023 | Sun | ........................ | B25J 9/1664 |
| | | | | 700/218 |
| 11,794,349 B2 * | 10/2023 | Kalouche | ............... | B25J 9/1697 |
| 11,795,012 B1 * | 10/2023 | Bacon | .................. | B65G 47/918 |
| 12,258,227 B2 * | 3/2025 | Pidaparthi | .............. | B25J 9/1664 |
| 2017/0080566 A1 * | 3/2017 | Stubbs et al. | | |
| 2017/0369244 A1 * | 12/2017 | Battles et al. | | |
| 2019/0337723 A1 * | 11/2019 | Wagner et al. | | |
| 2021/0130025 A1 * | 5/2021 | Schaafsma et al. | | |
| 2021/0179356 A1 * | 6/2021 | Chen et al. | | |

* cited by examiner

*Primary Examiner* — Douglas A Hess
(74) *Attorney, Agent, or Firm* — Sughrue Mion, PLLC

(57) ABSTRACT

A conveyor system and methods thereof are provided. A conveyor system includes a conveyor configured to move products, and a first conveyor picker. The first conveyor picker includes: a picker head including pickers that are configured to pick up respective ones of the products and put the products onto the conveyor, such that the products are in a non-overlapped state, with respect to each other, in a first arrangement on the conveyor; and at least one first actuator configured to move the picker head to and from the conveyor.

16 Claims, 12 Drawing Sheets

100

100

CONVEYOR SYSTEM INCLUDING CONVEYOR PICKER

BACKGROUND

1. Field

Embodiments of the present disclosure are directed to an arrangement system and, more particularly, a conveyor system including a conveyor picker.

2. Related Art

In the related art, products are dropped through, for example, a chute onto a conveyor so that the products can be moved by the conveyor. However, in such related art, the products tend to be overlapped on the conveyor, thereby making it difficult, for example, for devices to identify each of the products on the conveyor and to individually pick up each of the products from the conveyor.

SUMMARY

Embodiments of the present disclosure solve the above problems and/or other problems.

Embodiments of the present disclosure include an arrangement system, including a feeding system, a vibratory balancing feeder, and a special picker, that enable products to be placed in a non-overlapped or minor overlapping state on a conveyor of the conveyor system. Accordingly, each of the products and their positions may be correctly identified by, for example, a detector system and a controller of the conveyor system, and the products may be quickly and efficiently picked up from the conveyor by a manipulating (e.g., robotic) picker of the conveyor system based on the identified positions of the products.

Embodiments of the present disclosure include a conveyor system, including a first conveyor picker, that enables products to be placed in a non-overlapped state on a conveyor of the conveyor system. Accordingly, each of the products and their positions may be correctly identified by, for example, a detector system and a controller of the conveyor system, and the products may be quickly and efficiently picked up from the conveyor by a second conveyor picker of the conveyor system based on the identified positions of the products.

According to embodiments of the present discourse, the products may be bags, parts (e.g., mechanical parts or general parts), food products, and/or agriculture products.

According to embodiments of the present disclosure, a conveyor system is provided. The conveyor system may include, for example, a conveyor configured to move products; and a first conveyor picker, wherein the first conveyor picker may include, for example, a picker head including pickers that are configured to pick up respective ones of the products and put the products onto the conveyor, such that the products are in a non-overlapped state, with respect to each other, in a first arrangement on the conveyor; and at least one first actuator configured to move the picker head to and from the conveyor.

According to one or more embodiments of the present disclosure, the pickers may be spaced from each other within a horizontal plane.

According to one or more embodiments of the present disclosure, the pickers may be arranged in the first arrangement.

According to one or more embodiments of the present disclosure, the conveyor system further includes, for example, a container configured to include the products therein, wherein the pickers are configured to pick up the respective ones of the products from the container, and the least one first actuator is configured to move the picker head to the container.

According to one or more embodiments of the present disclosure, the conveyor system may further include, for example, at least one second actuator or spring that is configured to disperse the products within the container by oscillating the container. For example, the container may be configured as a vibratory table due to the at least one second actuator or spring.

According to one or more embodiments of the present disclosure, the at least one first actuator may be configured to move the picker head in a path having a shape of an arc.

According to one or more embodiments of the present disclosure, the pickers include may each include, for example, a vacuum gripper.

According to one or more embodiments of the present disclosure, the conveyor system may further include a detector system including at least one detector that is configured to sense positions of the products on the conveyor.

According to one or more embodiments of the present disclosure, the at least one detector may include a camera or similar optical device.

According to one or more embodiments of the present disclosure, the conveyor system may further include, for example: a controller configured to identify the positions of the products on the conveyor based on information obtained by the at least one detector; and a second conveyor picker including pickers that are configured to pick up the products from the conveyor, wherein the controller is further configured to control the second conveyor picker to pick up the products based on the positions of the products identified by the controller.

According to embodiments of the present disclosure, a method is provided. The method may include, for example: picking up, by a first conveyor picker, products from a first location; moving, by the first conveyor picker, the products onto a conveyor; moving, by the conveyor, the products to a second location, wherein the first conveyor picker includes: a picker head including pickers that are configured to pick up respective ones of the products and put the products onto the conveyor, such that the products are in a non-overlapped state, with respect to each other, in a first arrangement on the conveyor; and at least one first actuator configured to move the picker head to and from the conveyor.

According to one or more embodiments of the present disclosure, the picking up may include picking up, by the first conveyor picker, the products from a container.

According to one or more embodiments of the present disclosure, the method may further include oscillating, before picking up the products from container, the container while the products are within the container.

According to one or more embodiments of the present disclosure, the method may further include sensing, by at least one detector, positions of the products on the conveyor.

According to one or more embodiments of the present disclosure, the method may further include: identifying, by a controller, the positions of the products on the conveyor based on information obtained by the at least one detector; and controlling, by the controller, a second conveyor picker to pick up the products from the conveyor based on the positions of the products identified by the controller.

According to embodiments of the present disclosure, a conveyor system is provided. The conveyor system may include, for example: a first conveyor configured to move products to a container; the container, the container configured to have the products therein; a first conveyor picker configured to move the products from the container to a second conveyor; the second conveyor, the second conveyor configured to move the products; a detector system including at least one detector that is configured to sense positions of the products on the second conveyor; a controller configured to identify the positions of the products on the second conveyor based on information obtained by the at least one detector; and a second conveyor picker including pickers that are configured to pick up the products from the second conveyor, wherein the controller is further configured to control the second conveyor picker to pick up the products based on the positions of the products identified by the controller, and wherein the first conveyor picker includes: a picker head including pickers that are configured to pick up respective ones of the products from the container and put the products onto the second conveyor, such that the products are in a non-overlapped state, with respect to each other, in a first arrangement on the first conveyor; and at least one first actuator configured to move the picker head to and from the first conveyor and the container.

Arrangement systems (e.g., conveyor systems) according to embodiments of the present disclosure may more efficiently and quickly convey products to a destination. For example, the arrangement systems may be configured to arrange products on a conveyor in a particular manner so that a detector system may easily detect the presence and positions of each of the products on the conveyor. Accordingly, a conveyor picker of the arrangement systems may be configured to easily and quickly move the products based on the positions of the products P detected by the detector system.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

A conveyor system 1 according to embodiments of the present disclosure is described below with reference to FIGS. 1-12.

Figure 1:
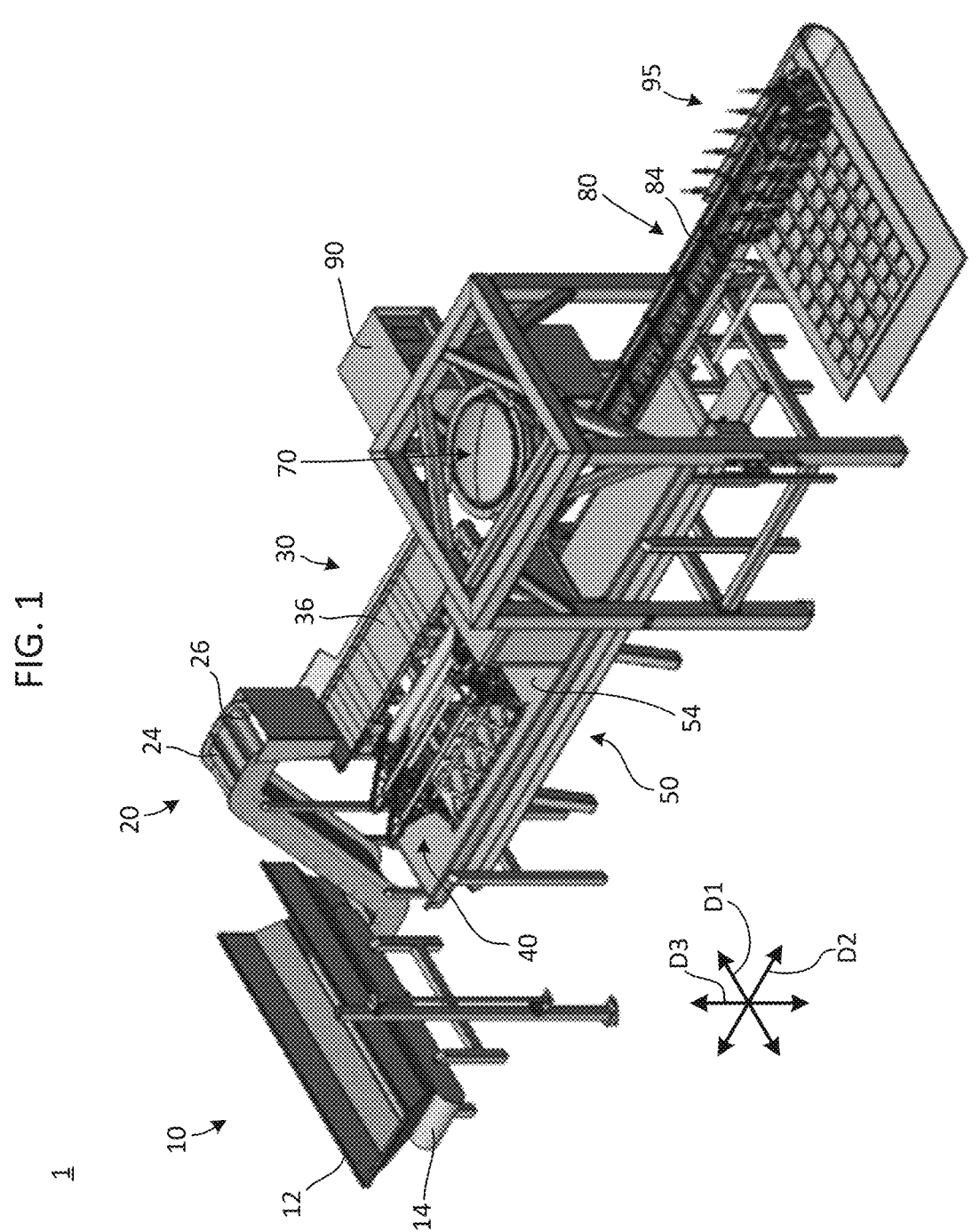
FIG. 1 illustrates a perspective view of a conveyor system according to embodiments of the present disclosure.
Figure 2:
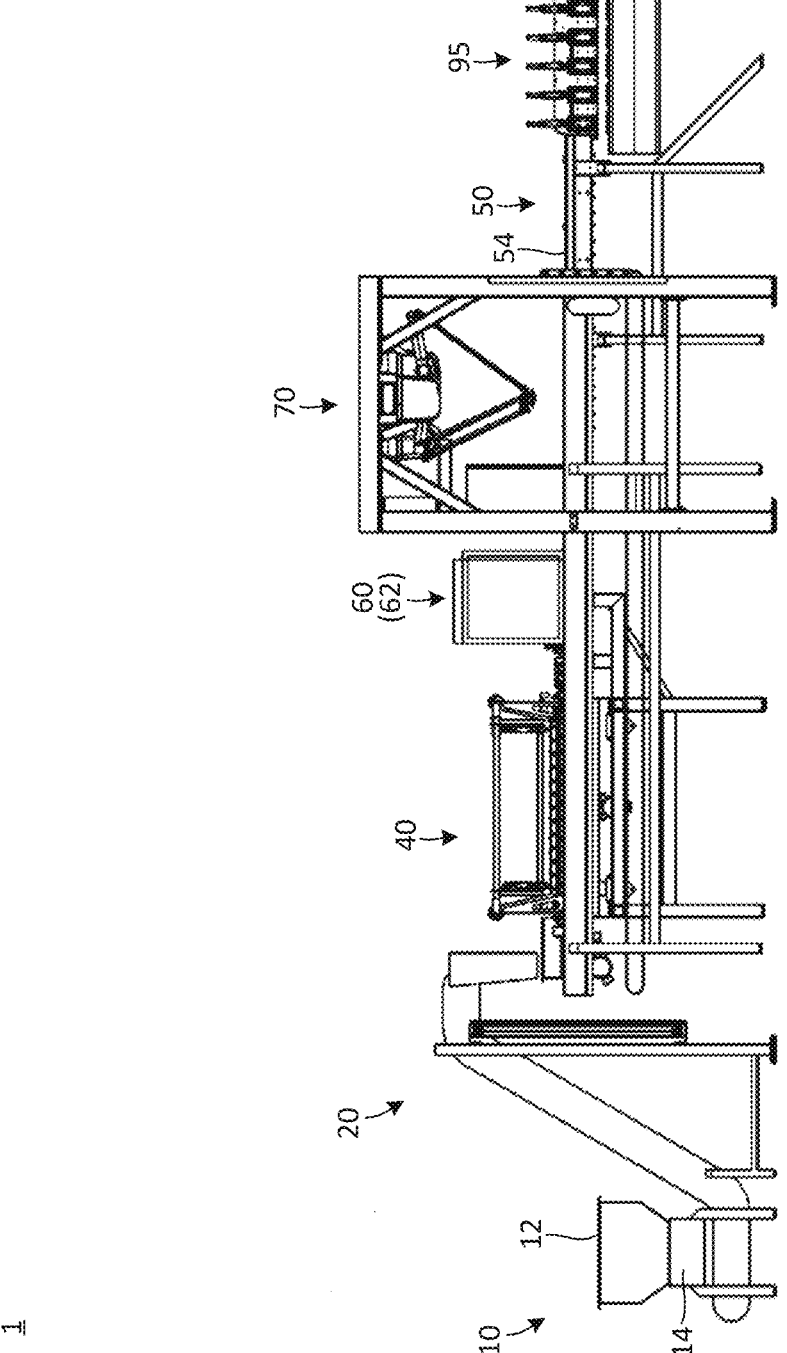
FIG. 2 illustrates a side view of the conveyor system according to embodiments of the present disclosure.
Figure 3:
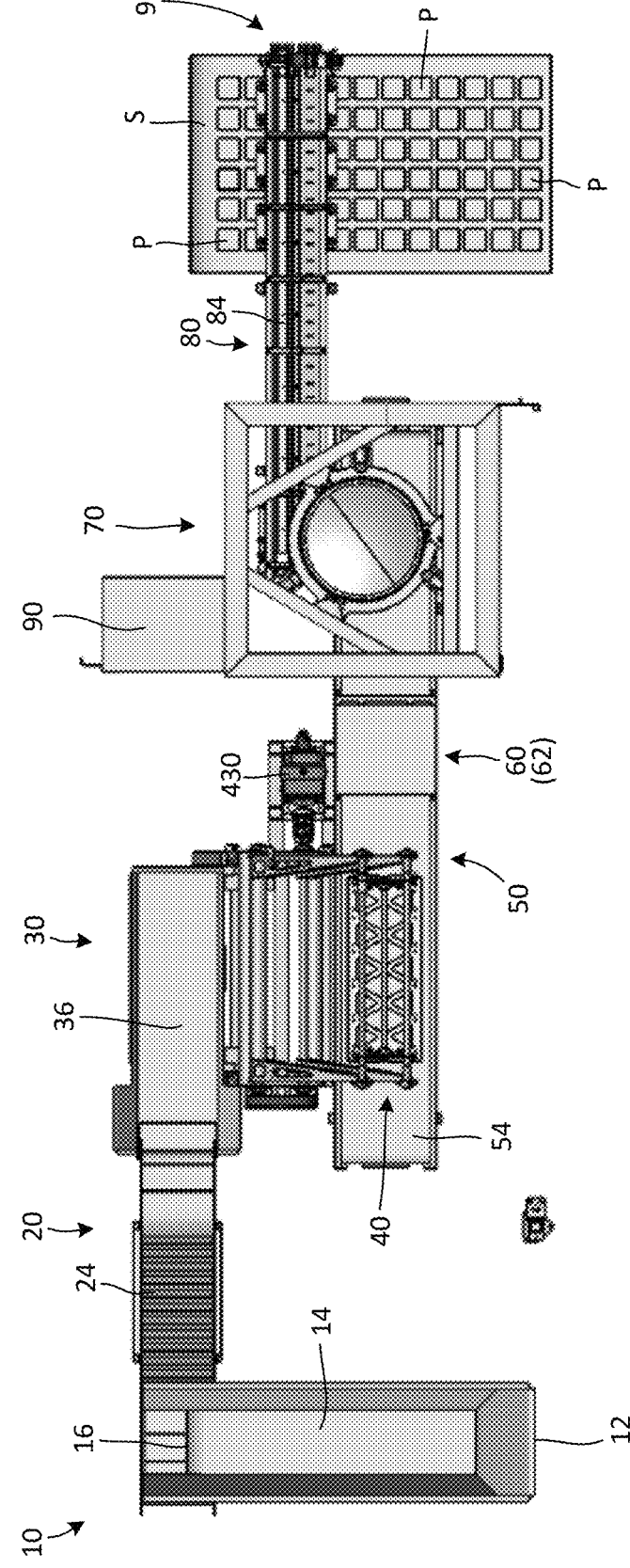
FIG. 3 illustrates a top view of the conveyor system according to embodiments of the present disclosure.
Figure 4:
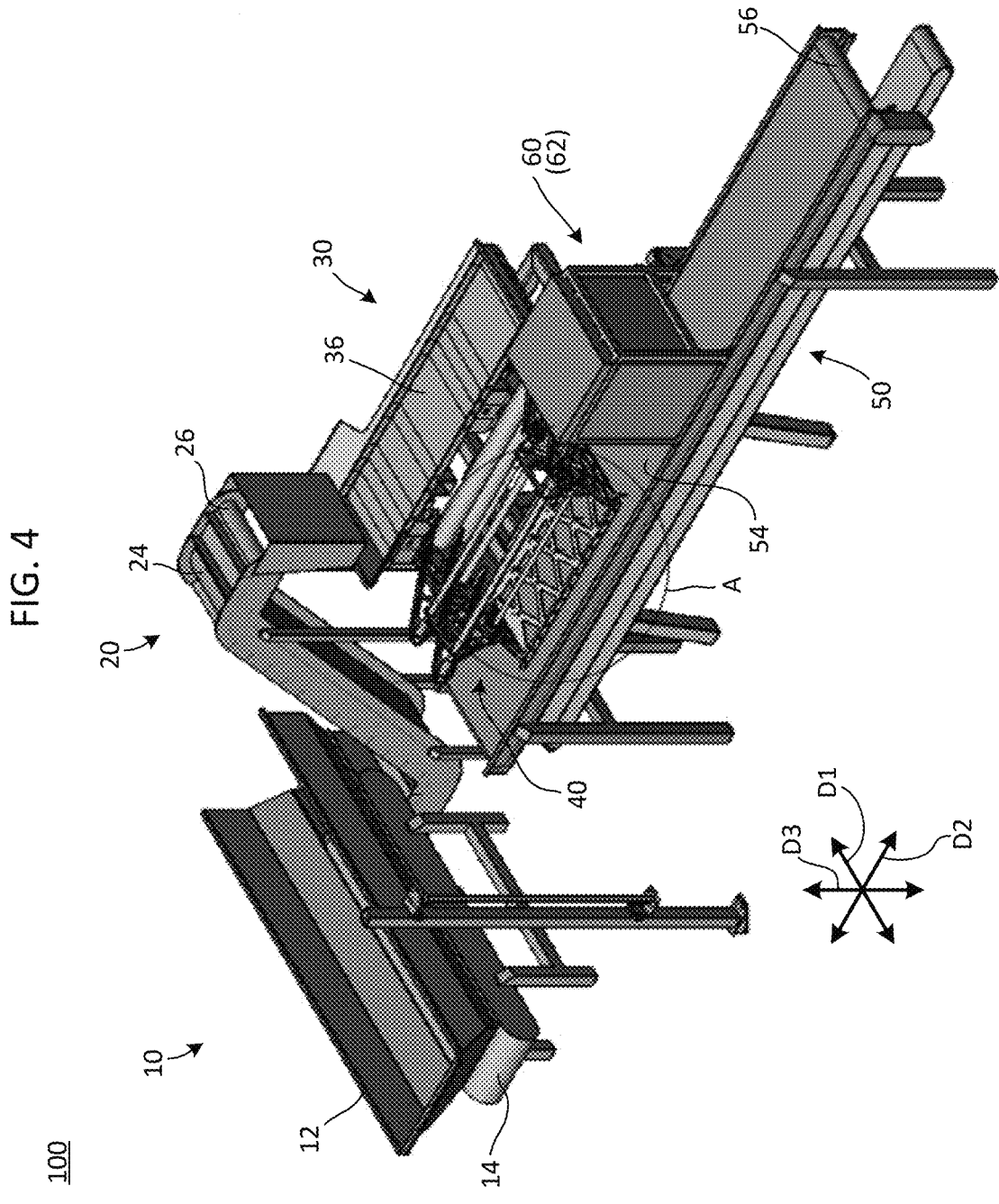
FIG. 4 illustrates a first perspective view of a picker system of the conveyor system according to embodiments of the present disclosure.
Figure 5:
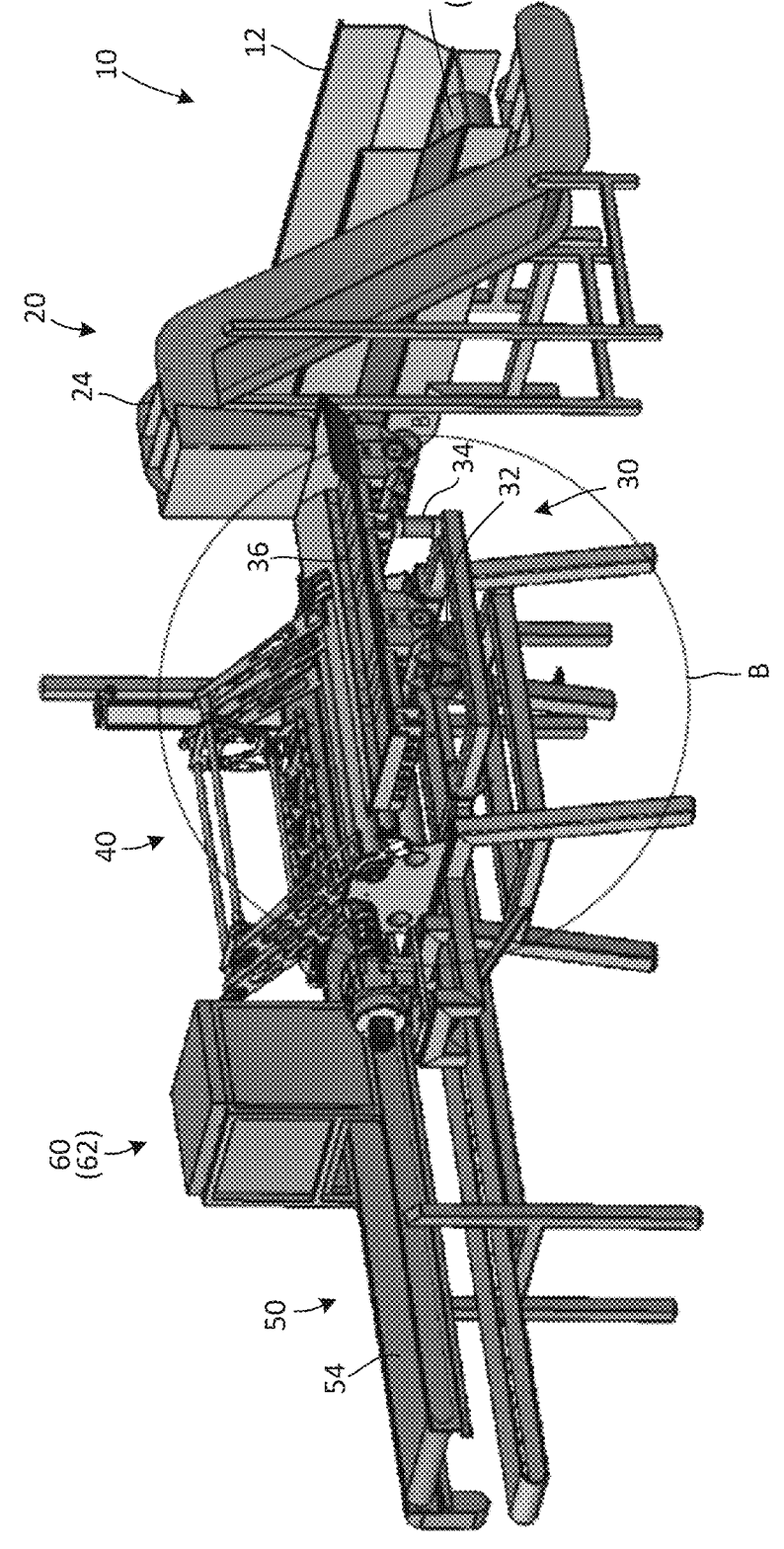
FIG. 5 illustrates a second perspective view of the picker system of the conveyor system according to embodiments of the present disclosure.
Figure 6:
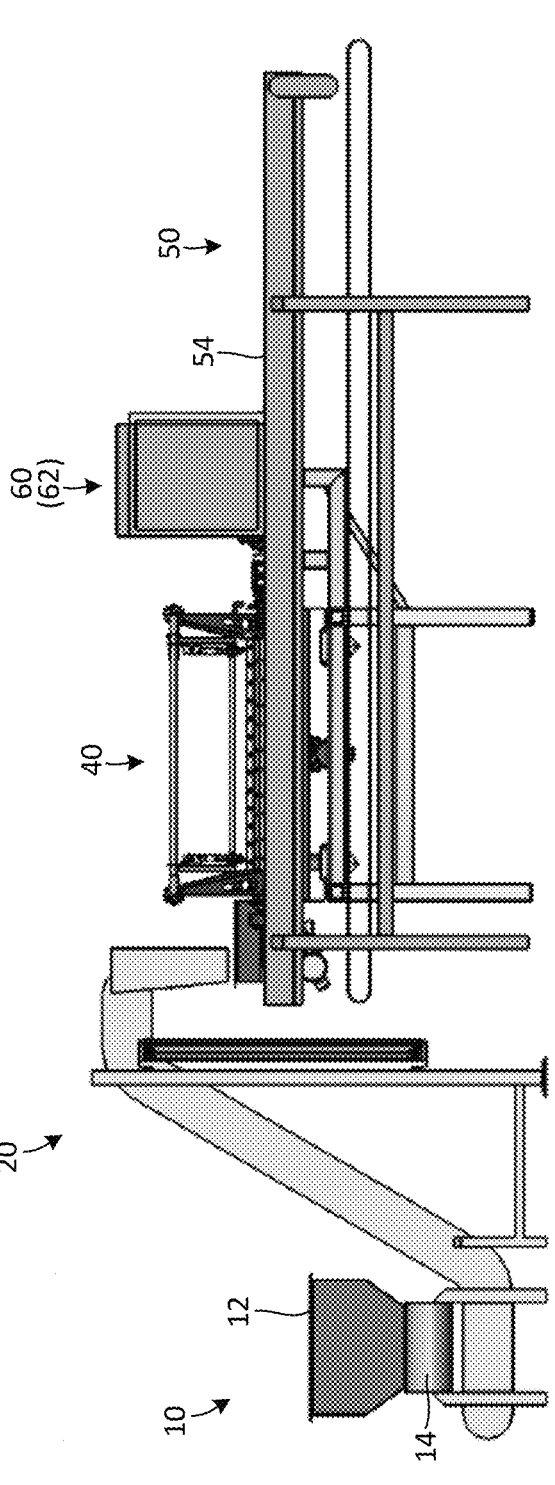
FIG. 6 illustrates a side view of the picker system of the conveyor system according to embodiments of the present disclosure.
Figure 7:
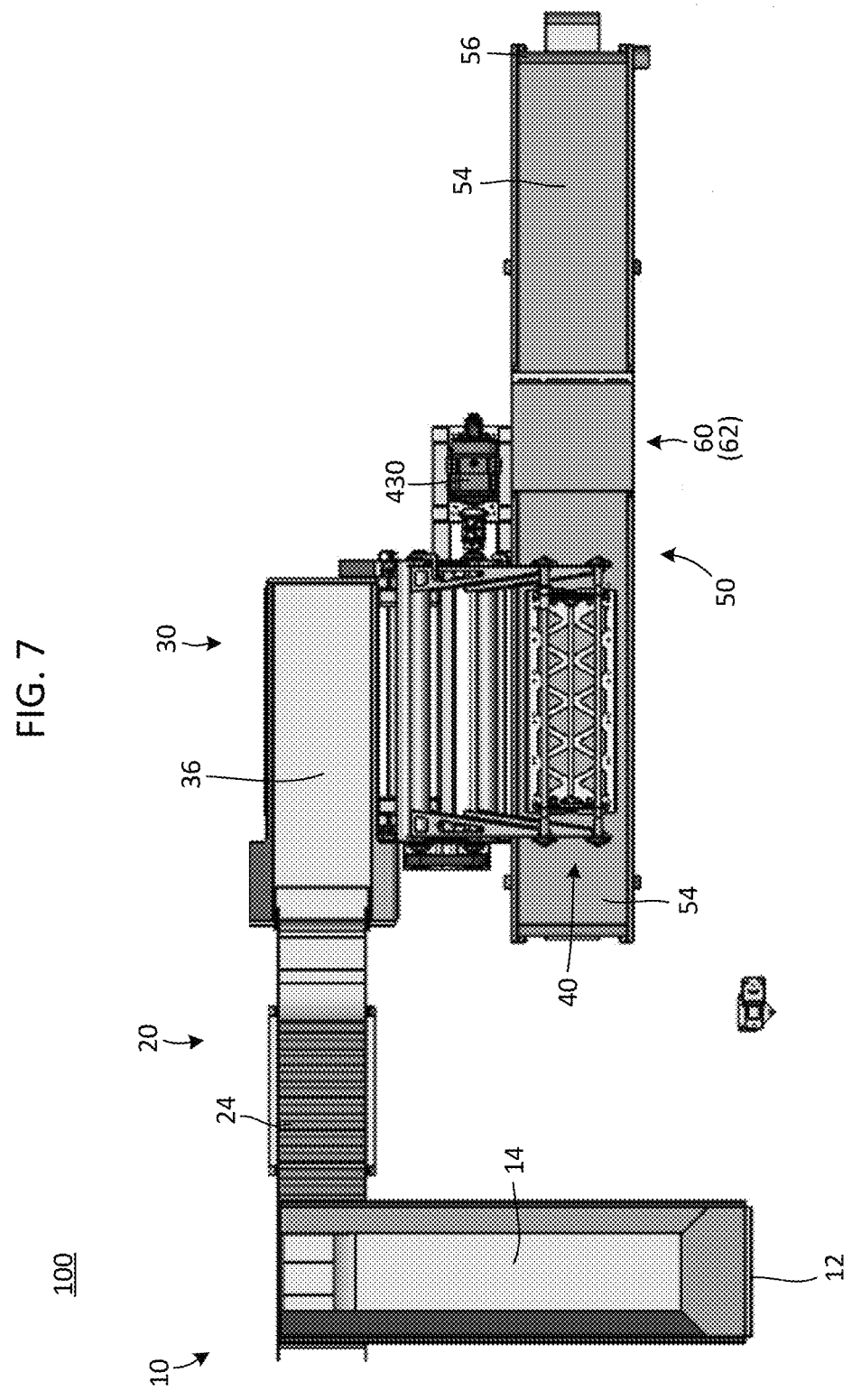
FIG. 7 illustrates a top view of the picker system of the conveyor system according to embodiments of the present disclosure.
Figure 8:
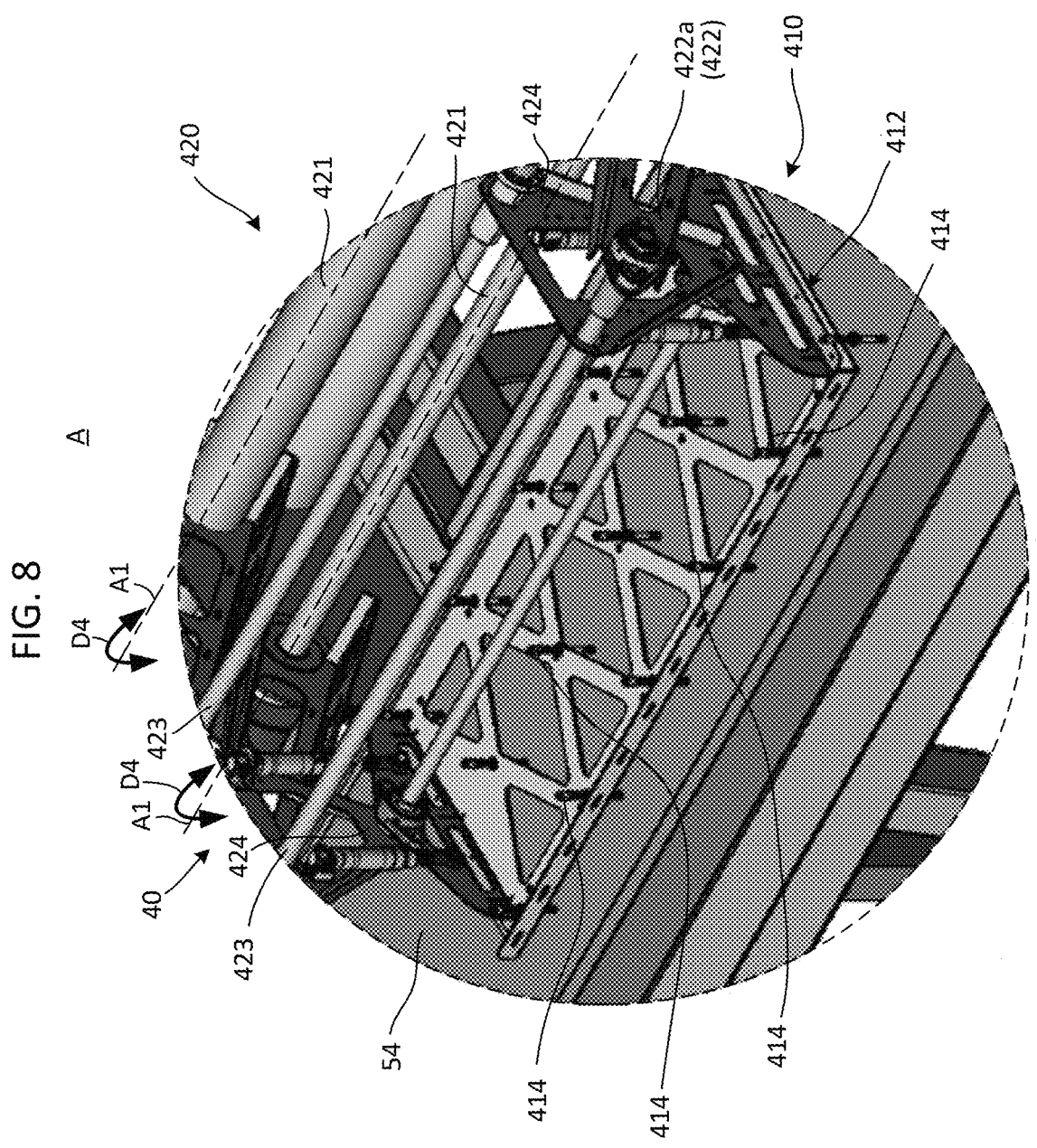
FIG. 8 is a magnified view of a part A of FIG. 4, which shows a first conveyor picker according to embodiments of the present disclosure.
Figure 9:
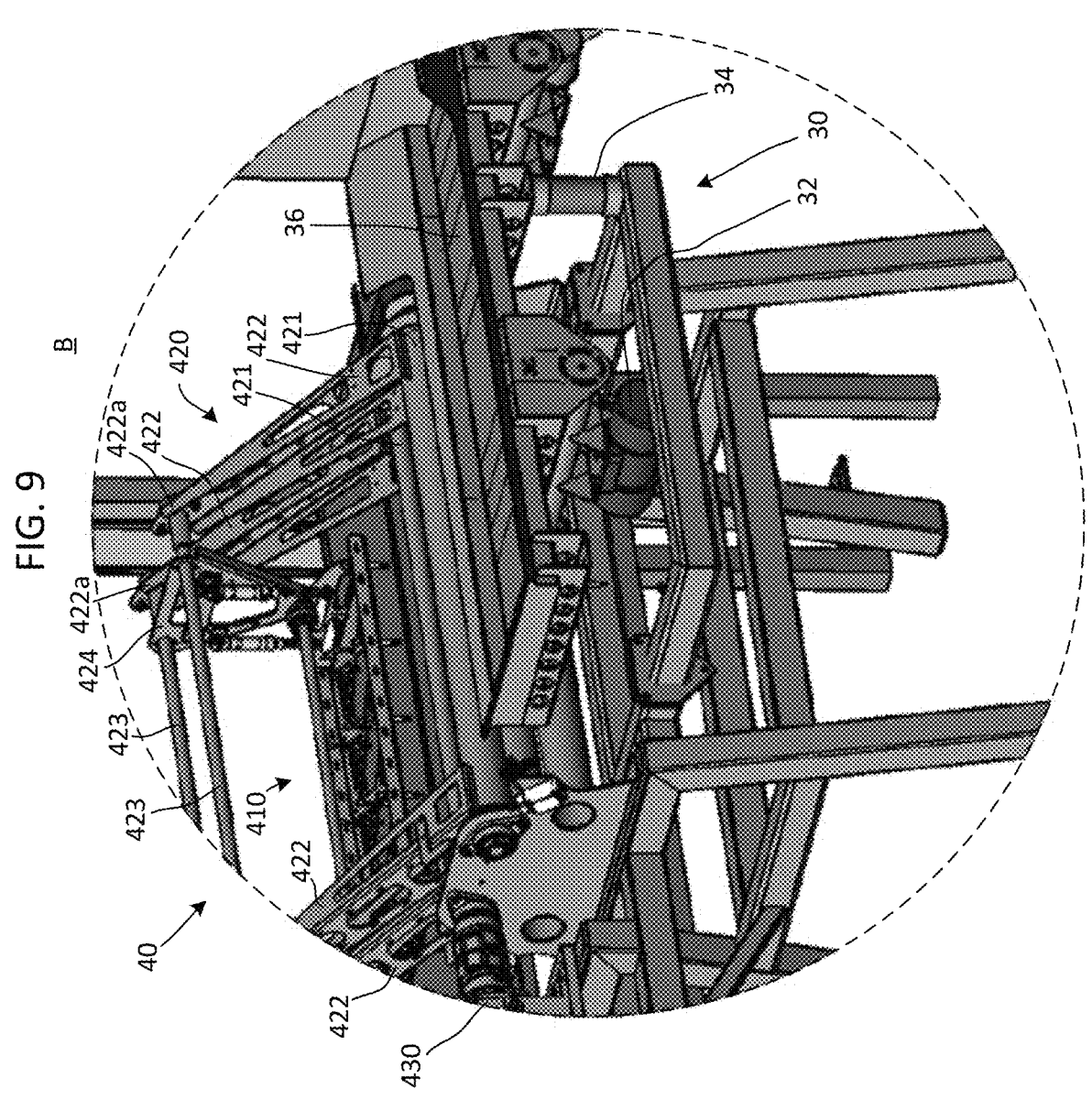
FIG. 9 is a magnified view of a part B of FIG. 5, which shows the first conveyor picker and a container according to embodiments of the present disclosure.
Figure 10:
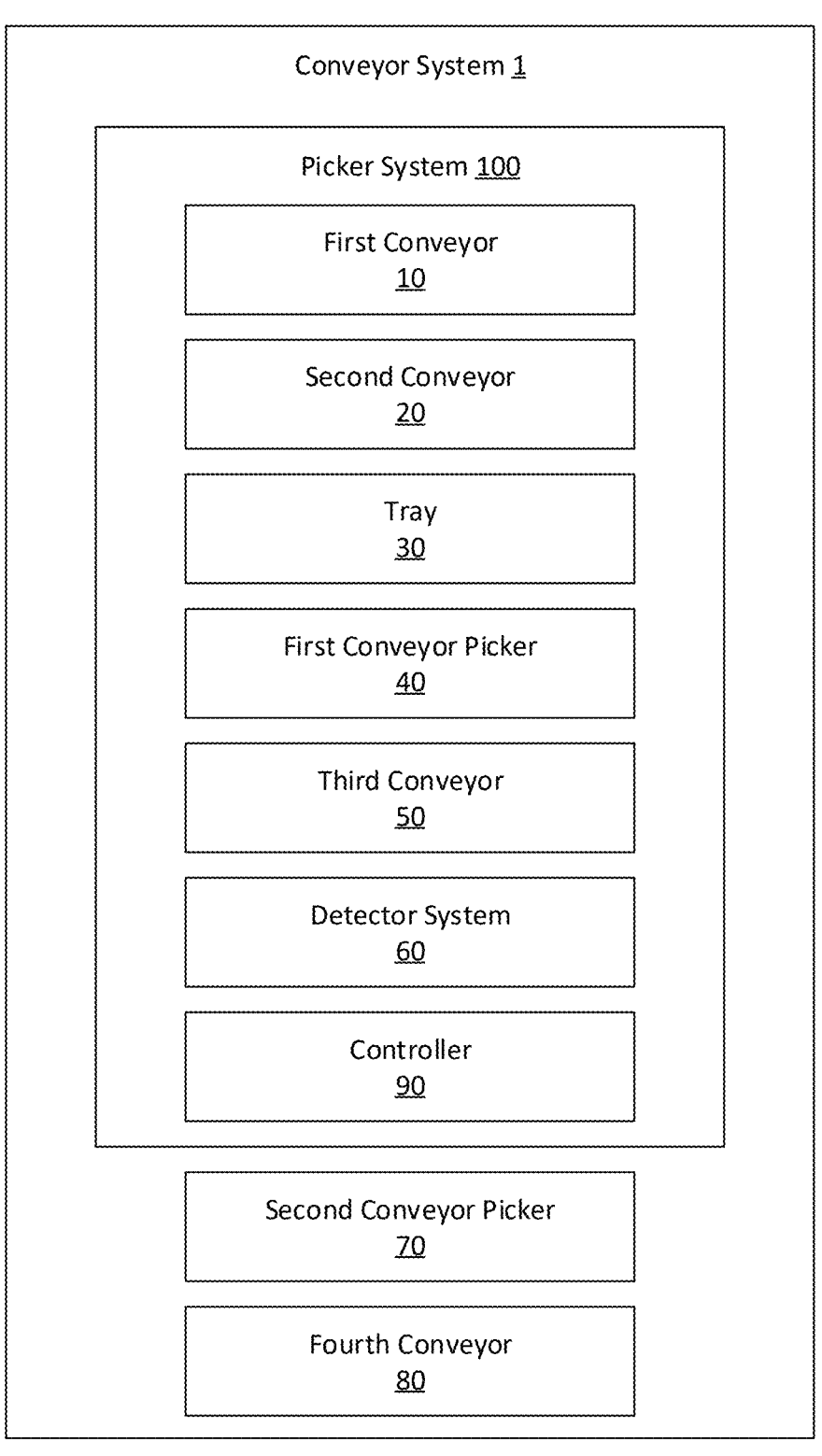
FIG. 10 is a block diagram of example components of the conveyor system according to embodiments of the present disclosure.
Figure 11:
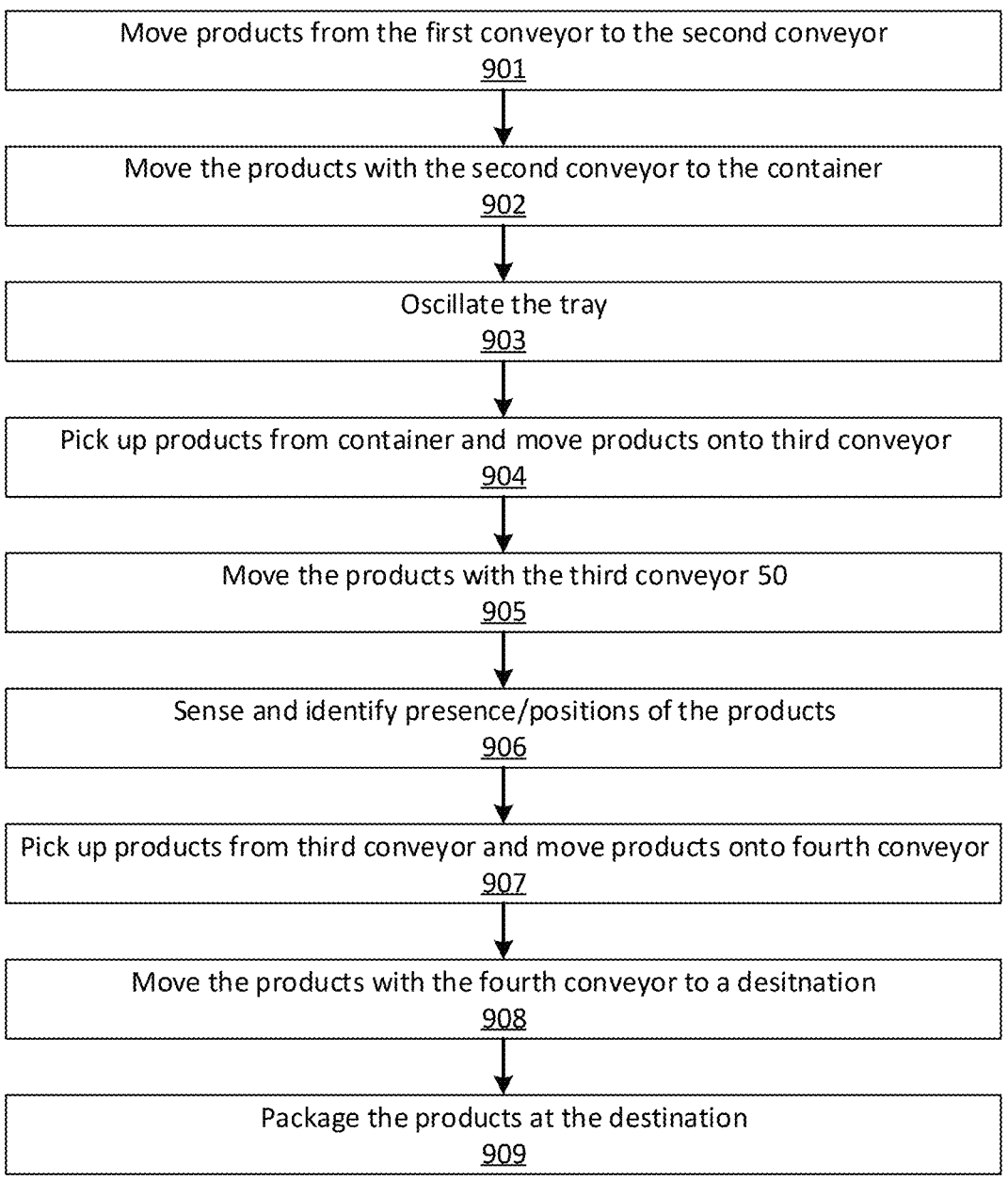
FIG. 11 is a block diagram illustrating a method according to embodiments of the present disclosure.
Figure 12:
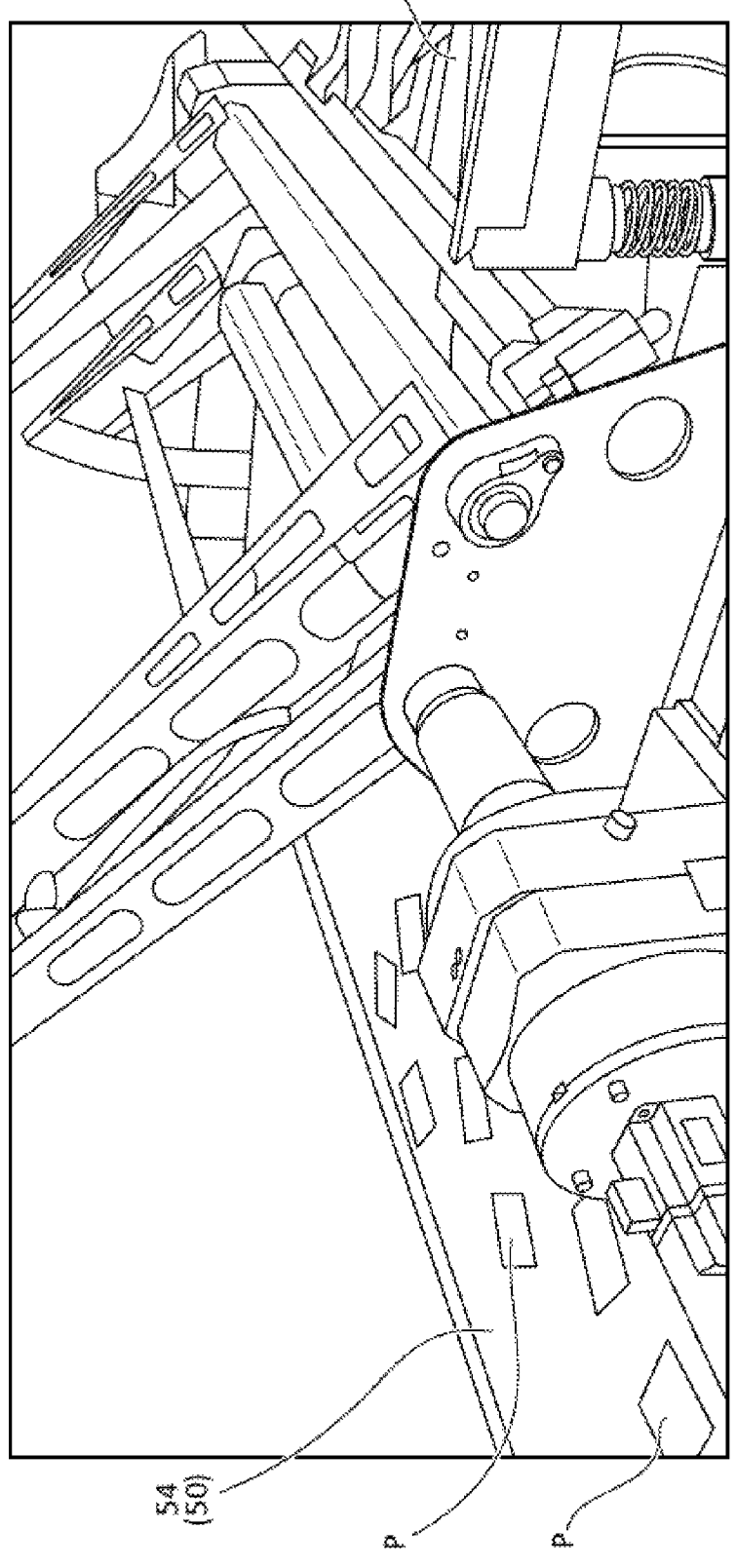
FIG. 12 is a perspective view illustrating examples of products according to embodiment of the present disclosure.

FIG. 1 illustrates a perspective view of the conveyor system 1 according to embodiments of the present disclosure. FIG. 2 illustrates a side view of the conveyor system 1 according to embodiments of the present disclosure. FIG. 3 illustrates a top view of the conveyor system 1 according to embodiments of the present disclosure. FIG. 4 illustrates a first perspective view of a picker system 100 of the conveyor system 1 according to embodiments of the present disclosure. FIG. 5 illustrates a second perspective view of the picker system 100 of the conveyor system 1 according to embodiments of the present disclosure. FIG. 6 illustrates a side view of the picker system 100 of the conveyor system 1 according to embodiments of the present disclosure. FIG. 7 illustrates a top view of the picker system 100 of the conveyor system 1 according to embodiments of the present disclosure. FIG. 8 is a magnified view of a part A of FIG. 4, which shows a first conveyor picker 40 according to embodiments of the present disclosure. FIG. 9 is a magnified view of a part B of FIG. 5, which shows the first conveyor picker 40 and a container 30 according to embodiments of the present disclosure. FIG. 10 is a block diagram of example components of the conveyor system 1 according to embodiments of the present disclosure. FIG. 11 is a block diagram illustrating a method according to embodiments of the present disclosure. FIG. 12 is a perspective view illustrating examples of products P according to embodiment of the present disclosure.

The conveyor system 1 may be configured move products P to a destination. The conveyor system 1 may include, for example, a picker system 100. The picker system 100 may include, for example, a first conveyor 10, a second conveyor 20, a container 30 (e.g., a tray), a first conveyor picker 40, a third conveyor 50, a detector system 60, and a controller 90. The conveyor system 1 may further include, for example, a second conveyor picker 70, a fourth conveyor 80, and a packaging machine 95.

The first conveyor 10 may be configured to move products P to the second conveyor 20. The second conveyor 20 may be configured to move the products P to the container 30. The container 30 may be configured to include the products P therein, and oscillate (e.g., vibrate) to reduce overlap among the products P. The first conveyor picker 40 may be configured to pick up the products P from the container 30 and place the products P onto the third conveyor 50 such that the products P are in a non-overlapped state (or minor overlapped state) with respect to each other in a first arrangement. The third conveyor 50 may be configured to move the products P in the first arrangement through the detector system 60 and to the second conveyor picker 70. The detector system 60 may be configured to detect the presence and positions of the products P on the third conveyor 50. The second conveyor picker 70 may be configured to pick up the products P from the third conveyor 50, based on the positions of the products P detected by the detector system 60, and place the products P on the fourth conveyor 80 in a second arrangement. The fourth conveyor 80 may be configured to move the products P in the second arrangement to a destination. The controller 90 may be connected to each of the first conveyor 10, the second conveyor 20, the container 30, the first conveyor picker 40, the third conveyor 50, the detector system 60, the second conveyor picker 70, and the fourth conveyor 80, and may be configured to cause such components to perform their respective functions.

The first conveyor 10 may include, for example, a feed chute 12 and a belt 14. The feed chute 12 may be configured to receive the products P from above and feed the products P downward, onto the belt 14. The belt 14 may be configured to actuated by at least one actuator (e.g., a motor) of the first conveyor 10 to move the products P to the second conveyor 20. For example, the belt 14 may be configured to be actuated to move the products P in a first horizontal direction D1 towards an end 16 of the first conveyor 10. At the end 16, the products P may be dropped onto the second conveyor 20 due to movement of the belt 14.

The second conveyor 20 may be configured as an escalating conveyor that is configured to move the products P to the container 30. The second conveyor 20 may include, for example, a belt 24. The belt 24 may be configured to actuated by at least one actuator (e.g., a motor) of the second conveyor 20 to move the products P to the container 30. For example, the belt 24 may be configured to be actuated to move the products P in a second horizontal direction D2 and a vertical direction D3 towards an end 26 of the second conveyor 20. At the end 26, the products P may be dropped into the container 30 due to movement of the belt 24.

The container 30 may be open at a top end thereof, and may be configured to oscillate (e.g., vibrate) to disperse the products P such as to reduce overlap among the products P in the container 30. For example, the container 30 may be provided with at least one actuator 32 and/or at least one spring 34 that is configured to cause the container 30 move back and forward rapidly in at least one from among the first horizontal direction D1, the second horizontal direction D2, and the vertical direction such that the products P are dispersed on a surface 36 of the container 30 along the first horizontal direction D1 and the second horizontal direction D2. In such state, a plurality of the products P may be easily picked up from the container 30 by the first conveyor picker 40.

The first conveyor picker 40 may be configured to pick up the products P from the container 30 such that the products P are held by the first conveyor picker 40 in a first arrangement in which the products P are in the non-overlapped state (or minor overlapped state) with respect to each other. The first conveyor picker 40 may then place the products P onto the third conveyor 50 such that the products P are in the non-overlapped state (or minor overlapped state) with respect to each other in the first arrangement. According to embodiments, the first conveyor picker 40 may include at least one picker that is configured to pick up and release the products P, and at least actuator that is configured to move the at least one picker such that the at least one picker is configured to pick up the products P from the surface 36 of the container 30, move the products P to the third conveyor 50, and place the products P onto the third conveyor 50 (e.g., onto a belt 54 of the third conveyor 50). Example details of the first conveyor picker 40 will be provided further below.

The third conveyor 50 may include, for example, a belt 54. The belt 54 may be configured to actuated by at least one actuator (e.g., a motor) of the third conveyor 50 to move the products P through the detector system 60 and to the second conveyor picker 70, while the products P are in the first arrangement. For example, the belt 54 may be configured to be actuated to move the products P in the second horizontal direction D2 towards an end 56 of the third conveyor 50 where the second conveyor picker 70 is located.

The detector system 60 may include, for example, at least one detector 62 that is configured to sense the presence and positions of the products P on the third conveyor 50. For example, the at least one detector 62 may include at least one vision sensor (e.g. a camera) that is configured to visually sense the presence and positions of the products P. However, embodiments of the present disclosure are not limited thereto, and the at least one detector 62 may additionally or alternatively include other types of detectors that are configured to sense the presence and positions of the products P. The detector system 60 may be configured to send data, indicating the presence and/or positions of the products P to the controller 90, and the controller 90 may identify presence and/or positions of the products P. According to embodiments, the controller 90 may be a part of the detector system 60. Because the products P are in the non-overlapped state (or minor overlapped state) with respect to each other in the first arrangement on the third conveyor 50, the detector 62 and the controller 90 may easily identify each of the products P and their positions.

The second conveyor picker 70 may be configured to pick up the products P from the third conveyor 50 such that the products P are held by the second conveyor picker 70 in a second arrangement. The second conveyor picker 70 may then place the products P onto the fourth conveyor 80 such that the products P are in the second arrangement. According to embodiments, the second arrangement may be different from the first arrangement. The second arrangement may be an arrangement in which the products P are in the non-overlapped or an overlapped state with respect to each other. For example, the second arrangement may be an arrangement in which the products P are non-overlapped, in two rows that extend in the second horizontal direction D2, and that are separated from each other in the first horizontal direction, but embodiments are not limited thereto. According to embodiments, the second conveyor picker 70 may include at least one picker that is configured to pick up and release the products P, and at least one actuator that is configured to move the at least one picker such that the at least one picker is configured to pick up the products P from the belt 54 of the third conveyor 50, move the products P to the fourth conveyor 80, and place the products P onto the fourth conveyor 80 (e.g., onto a belt 84 of the fourth conveyor 80). According to embodiments, the at least one picker may be configured as mechanical grippers, electric grippers, pneumatic grippers, magnetic grippers, vacuum grippers, etc. According to embodiments, the at least one picker may be two pickers that are configured to simultaneously pick up a respective one of the products P, and may simultaneously place the respective one of the products P into a respective one of two rows of the second arrangement, but embodiment of the present disclosure are not limited thereto.

According to embodiments, the second conveyor picker 70 may be implemented by a robot that is configured to move in one or more from among the first horizontal direction D1, the second horizontal direction D2, and the vertical direction D3.

According to embodiments, the controller 90 may identify the positions of the products P on the third conveyor 50 based on the information, that is received from the detector system 60 and that indicates the presence and/or positions of the products P, and the controller 90 may control the actuators and pickers of the second conveyor picker 70 to move to and pick up the products P based on such information. Accordingly, the products P may be quickly and efficiently picked up by the second conveyor picker 70.

The fourth conveyor 80 may include, for example, a belt 84. The belt 84 may be configured to be actuated by at least one actuator of the fourth conveyor 80 to move the products P to a destination. For example, the belt 84 may be configured to be actuated to move the products P in the second horizontal direction D2, towards the destination. According to embodiments, the destination may be a packaging machine 95 that is configured to package (e.g., laminate and/or place) the products P on a sheet S.

The controller 90 may include at least one processor and memory storing computer instructions. The computer instructions may be configured to, when executed by the at least one processor, cause the controller 90 to perform its functions. For example, based on the executed computer instructions, the controller 90 may control actuators of each of the first conveyor 10, the second conveyor 20, the container 30, the first conveyor picker 40, the third conveyor 50, the second conveyor picker 70, and the fourth conveyor 80, and may also control pickers (e.g., grippers) of the first conveyor picker 40 and the second conveyor picker 70. Also, based on the executed computer instructions, the controller 90 may further identify the positions of the products P on the third conveyor 50 based on the information that is received from the detector system 60 and that indicates the presence and/or positions of the products P, and the controller 90 may control the actuators and pickers of the second conveyor picker 70 to move to and pick up the products P based on such information.

Referring to FIGS. 8-9, the first conveyor picker 40 may include a picker head 410, a frame 420, and at least one actuator 430. The picker head 410 may attached to the frame 420, and the at least one actuator 430 may be attached to the frame 420 an d configured to actuate components of the frame 420, such that the components of the frame 420 and the picker head 410 are configured to move.

According to embodiments, the picker head 410 may include at least one body 412 (e.g., a picker frame) and a plurality of pickers 414 that are attached to the at least one body 412. After the picker head 410 is actuated by the at least one actuator 430 to the container 30, each of the plurality of pickers 414 may be configured to simultaneously pick up a respective one of the products P from the container 30. Then, after the picker head 410 is moved by the at least one actuator 430 to the third conveyor 50, each of the plurality of pickers 414 may be configured to simultaneously place the respective one of the products P onto the belt 54 of the third conveyor 50 such that the products P are in a non-overlapped state (or minor overlapped state) with respect to each other in the first arrangement. The plurality of pickers 414 may be attached to the at least one body 412 such that the plurality of pickers 414 have the first arrangement. For example, the first arrangement may be one in which the plurality of pickers 414 (and the products picked up by the plurality of pickers 414) are spaced from each other in the first horizontal direction D1 and the second horizontal direction D2, in a plurality of rows. As shown in FIG. 8, the first arrangement is three staggered rows within a horizontal plane. However, embodiments of the present disclosure are not limited thereto, and the first arrangement may be various configurations. Because the plurality of pickers 414 may be in the first arrangement, the products P may consistently place the products P onto the third conveyor 50 in the first arrangement. Thus, the controller 90 may easily identify the presence and locations of the products P, and the products P may be quickly and efficiently picked up by the second conveyor picker 70.

According to embodiments, the plurality of pickers 414 may be configured to grip the products P in various manners. For example, the plurality of pickers 414 may be configured as mechanical grippers, electric grippers, pneumatic grippers, magnetic grippers, vacuum grippers, etc. The mechanical grippers may include non-powered grippers that include forks, hooks, fingers, etc., that are configured to hold and release the products P. The electric grippers may include bodies (e.g., fingers) that are configured to hold and release the products P based on actuation by an electric actuator (e.g., a motor). The pneumatic grippers may include bodies (e.g., fingers) that are configured to hold and release the products P based on actuation by fluid from a pneumatic device (e.g., a pump configured to compress fluid such as air). The magnetic grippers may include a magnetic device (e.g., permanent magnets, temporary magnets, and/or electromagnets) that is configured to hold and release the products P using a magnetic force when the products P include, for example, a ferromagnetic material. The vacuum grippers may include suction tips that are configured to hold (and release) the products P based on a present (and absence) of a vacuum force applied by the suction tips. For example, the suction tips may be attached to a pneumatic device (e.g., a compressed air pump) via, for example, at least one tube. The pneumatic device may be configured to generate a vacuum force such that one or more of the suctions tips picks up respective ones of the products P, and the pneumatic device, based on reducing or stopping generation of the vacuum force, causes the one or more suction tips to drop the respective ones of the products P. According to embodiments, the components (e.g., electric actuators and pneumatic devices) that are configured to cause the various grippers to hold and release the products P may be included in the first conveyor picker 40 or may be separately provided from the first conveyor picker 40 in the conveyor system 1 (e.g., in the picker system 100).

According to embodiments, the frame 420 may include at least one first shaft 421 that is configured to be rotated by the at least one actuator 430. The at least one first shaft 421 may extend in the second horizontal direction D2, and may include, for example, two first shafts 421 that are parallel to each other and separated from each other in the first horizontal direction D1.

The frame 420 may further include first bodies 422 attached to respective sides of the at least one first shaft 421 in the second horizontal direction D2, such that the first bodies 422 extend perpendicular to the at least one first shaft 421. Based on rotation of the at least one first shaft 421, due to actuation by the at least one actuator 430, distal ends 422a of the first bodies 422 may rotate in a circumferential directions D4, around a first axis A1, towards or away from the surface 36 of the container 30 and the top surface of the belt 54 of the third conveyor 50.

The frame 420 may further include at least one second shaft 423 that may extend in the second horizontal direction D2 and may be each attached to, at respective ends of the second shaft 432, to the distal end 422a of a respective one of the first bodies 422 such that the at least one second shaft 423 is also configured to move in the circumferential directions D4 based on actuation by the at least one actuator 430. The at least one second shaft 423 may include, for example, two second shafts 423 that are parallel to each other and separated from each other in the first horizontal direction D1.

The frame 420 may further include second bodies 424 (e.g., mounting brackets) that are attached, at top ends of the second bodies 424, to the at least one second shaft 423, and may be further attached, at bottom ends of the second bodies 424, to the at least one body 412 of the picker head 410. The second bodies 424, and the picker head 410 attached thereto, may be configured to move in the circumferential directions D4 based on rotation of the at least one first shaft 421, due to actuation by the at least one actuator 430. Accordingly, the picker head 410 may be moved to both the surface 36 of the container 30 and the top surface of the belt 54 of the third conveyor 50.

According to embodiments, the at least one body 412 of the picker head 410 may be attached to the bottom ends of the second bodies 424. When the picker head 410 is moved in one of the circumferential directions D4 with respect to the first axis A1 due to actuation by the at least one actuator 430, a plane that includes distal ends of each of the plurality of pickers 414 of the picker head 410 may be maintained substantially parallel to the top surface of the belt 54 of the third conveyor 50 and the surface 36 the container 30.

As described above, components of the frame 420 may be configured to move the picker head 410 in a path having a shape of an arc based on actuation by the at least one actuator 430. However, embodiments of the present disclosure are not limited thereto. For example, components of the frame 420 may be configured to move the picker head 410 in various paths having various shapes. For example, the paths may have one or more of curved portions and/or linear portions in various directions including, for example, the first horizontal direction D1, the second horizontal direction D2, and/or the vertical direction D3.

According to embodiments, the first conveyor picker 40 may include various mechanical systems that are configured to move the at least one body 412 of the picker head 410. For example, the mechanical system may include a manipulator (e.g., a robotic component such as a robotic arm) that may be configured to move in one or more (e.g. some or all) of x, y, and z directions, such that the mechanical system may take the products P from the container 30 to the third conveyor 50.

With reference FIG. 11, the controller 90 may be configured to cause the conveyor system 1 to perform its functions described above. For example, the controller 90 may control the first conveyor 10 to move products P to the second conveyor 20 (step 901). The controller 90 may control the second conveyor 20 to move the products P to the container 30 (step 902). The controller 90 may control the container 30 to oscillate (e.g., vibrate) to disperse the products P such as to reduce overlap among the products P in the container 30 (step 903). The controller 90 may control the first conveyor picker 40 to pick up the products P from the container 30 and move the products P onto the third conveyor 50 (step 904). The controller 90 may control the third conveyor 50 to move the products P through the detector system 60 and to the second conveyor picker 70 (step 905). The controller 90 may control the detector system 60 to sense (e.g., image) the products P while the products P move through the detector system 60, and the controller 90 may identify the presence and/or positions of the products P based on information obtained from the detector system 60 (step 906). The controller 90 may control the second conveyor picker 70 may to pick up the products P from the third conveyor 50, based on the identified presence and/or positions of the products P, and control the second conveyor picker 70 to place the products P onto the fourth conveyor 80 (step 907). The controller 90 may control the fourth conveyor 80 to move the products P to the destination (step 908). The controller 90 may control a packaging machine 95 (e.g., of the conveyor system 1) to package the products P at the destination (step 909).

Embodiments of the present disclosure may achieve the advantages described herein. It should also be appreciated that various modifications, adaptations, and alternative embodiments thereof may be made within the scope and spirit of the present disclosure.

What is claimed is:

1. A conveyor system comprising:
   a conveyor configured to move products;
   a first conveyor picker; and
   a container configured to include the products therein,
   wherein the first conveyor picker comprises:
      a picker head comprising pickers that are configured to pick up respective ones of the products and put the products onto the conveyor, such that the products are in a non-overlapped state, with respect to each other, in a first arrangement on the conveyor; and
      at least one first actuator configured to move the picker head to and from the conveyor,
   wherein the pickers are configured to pick up the respective ones of the products from the container, and the at least one first actuator is configured to move the picker head to the container, and
   wherein the conveyor system further comprises at least one second actuator or spring that is configured to disperse the products within the container by oscillating the container.

2. The conveyor system of claim 1, wherein the pickers are spaced from each other within a horizontal plane.

3. The conveyor system of claim 2, wherein the pickers are arranged in the first arrangement.

4. The conveyor system of claim 1, wherein the at least one first actuator is configured to move the picker head in a path having a shape of an arc.

5. The conveyor system of claim 1, wherein each of the pickers comprise a vacuum gripper.

6. The conveyor system of claim 1, further comprising:
   a detector system comprising at least one detector that is configured to sense positions of the products on the conveyor.

7. The conveyor system of claim 6, wherein the at least one detector comprises a camera.

8. The conveyor system of claim 6, further comprising:
   a controller configured to identify the positions of the products on the conveyor based on information obtained by the at least one detector; and
   a second conveyor picker comprising pickers that are configured to pick up the products from the conveyor,
   wherein the controller is further configured to control the second conveyor picker to pick up the products based on the positions of the products identified by the controller.

9. A method comprising:
   picking up, by a first conveyor picker, products from a first location;
   moving, by the first conveyor picker, the products onto a conveyor;
   moving, by the conveyor, the products to a second location,
   wherein the first conveyor picker includes:

a picker head including pickers that are configured to pick up respective ones of the products and put the products onto the conveyor, such that the products are in a non-overlapped state, with respect to each other, in a first arrangement on the conveyor; and at least one first actuator configured to move the picker head to and from the conveyor, wherein the picking up comprises picking up, by the first conveyor picker, the products from a container, and wherein the method further comprises oscillating, before the picking up the products from the container, the container while the products are within the container.

10. The method of claim 9, wherein the pickers are spaced from each other within a horizontal plane.

11. The method of claim 10, wherein the pickers are arranged in the first arrangement.

12. The method of claim 9, wherein the at least one first actuator is configured to move the picker head in a path having a shape of an arc.

13. The method of claim 9, wherein each of the pickers include a vacuum gripper.

14. The method of claim 9, further comprising sensing, by at least one detector, positions of the products on the conveyor.

15. The method of claim 14, further comprising:

identifying, by a controller, the positions of the products on the conveyor based on information obtained by the at least one detector; and controlling, by the controller, a second conveyor picker to pick up the products from the conveyor based on the positions of the products identified by the controller.

16. A conveyor system comprising:

a first conveyor configured to move products to a container;

the container, the container configured to have the products therein;

a first conveyor picker configured to move the products from the container to a second conveyor;

the second conveyor, the second conveyor configured to move the products;

a detector system comprising at least one detector that is configured to sense positions of the products on the second conveyor;

a controller configured to identify the positions of the products on the second conveyor based on information obtained by the at least one detector; and a second conveyor picker comprising pickers that are configured to pick up the products from the second conveyor, wherein the controller is further configured to control the second conveyor picker to pick up the products based on the positions of the products identified by the controller, wherein the first conveyor picker comprises:

a picker head comprising pickers that are configured to pick up respective ones of the products from the container and put the products onto the second conveyor, such that the products are in a non-overlapped state, with respect to each other, in a first arrangement on the first conveyor; and at least one first actuator configured to move the picker head to and from the first conveyor and the container, and wherein the conveyor system further comprises at least one second actuator or spring that is configured to disperse the products within the container by oscillating the container.

* * * * *